(12) United States Patent
Torp et al.

(10) Patent No.: US 6,277,075 B1
(45) Date of Patent: Aug. 21, 2001

(54) METHOD AND APPARATUS FOR VISUALIZATION OF MOTION IN ULTRASOUND FLOW IMAGING USING CONTINUOUS DATA ACQUISITION

(75) Inventors: Hans Garmann Torp; Steinar Bjaerum, both of Trondheim (NO)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/449,389

(22) Filed: Nov. 26, 1999

(51) Int. Cl.[7] .................................................. A61B 8/00
(52) U.S. Cl. ............................................ 600/443; 600/447
(58) Field of Search ..................................... 600/443, 444, 600/447, 448, 449, 455

(56) References Cited

U.S. PATENT DOCUMENTS

| | | | |
|---|---|---|---|
| 4,888,694 | 12/1989 | Chesarek | 364/413.24 |
| 5,669,387 | * 9/1997 | Mine | 600/447 |
| 5,701,897 | * 12/1997 | Sano | 600/443 |
| 6,132,376 | * 10/2000 | Hossack et al. | 600/443 |

OTHER PUBLICATIONS

Ferrara et al., "Color flow mapping," Ultrasound Med. Biol., vol. 23, No. 3, pp. 321–345, 1997.

Kasai et al., "Real–time two–dimensional blood flow imaging using an autocorrelation technique," IEEE Trans. Sonics Ultrason., vol. 32, No. 3, pp. 458–464, May 1985.

Fox, "Multiple crossed–beam ultrasound Doppler velocimetry," IEEE Trans. Sonics Ultrason., vol. 25, No. 5 pp. 281–286, Sep. 1978.

Newhouse et al., "Ultrasound Doppler probing of flows transverse with respect to beam axis," IEEE Trans. Biomed. Eng., vol. 34, No. 10, pp. 779–789, Oct. 1987.

Trahey et al., "Angle independent ultrasonic detection of blood flow," IEEE Trans. Biomed. Eng., vol. 34, No. 12, pp. 965–967, Dec. 1987.

Jensen et al., "A new method for estimation of velocity vectors," IEEE Trans. Ultrason., Ferroelect., Freq. Contr., vol. 45, No. 3, pp. 837–851, May 1998.

Anderson, "Multi–dimensional velocity estimation with ultrasound using spatial quadrature," IEEE Trans. Ultrason., Ferroelect., Freq. Contr., vol. 45, No. 3, pp. 852–861, 1998.

* cited by examiner

Primary Examiner—Marvin M. Lateef
Assistant Examiner—Maulin Patel
(74) Attorney, Agent, or Firm—Christian G. Cabou; Dennis M. Flaherty

(57) ABSTRACT

A method and an apparatus for imaging blood motion by displaying an enhanced image of the fluctuating speckle pattern. A continuous stream of data frames, each the result of one scan, is available for processing. For each position in the scan plane, a respective time sequence of signal samples is available for processing. The first step in the blood motion image processing is high-pass filtering of this signal. Following the high-pass filter, a speckle signal is formed, e.g., by calculating the squared magnitude (i.e., power) of the high-pass-filtered signal (I/Q or RF). The resulting speckle signal can then undergo a nonlinear amplitude transformation to form a blood motion imaging signal for display.

32 Claims, 6 Drawing Sheets

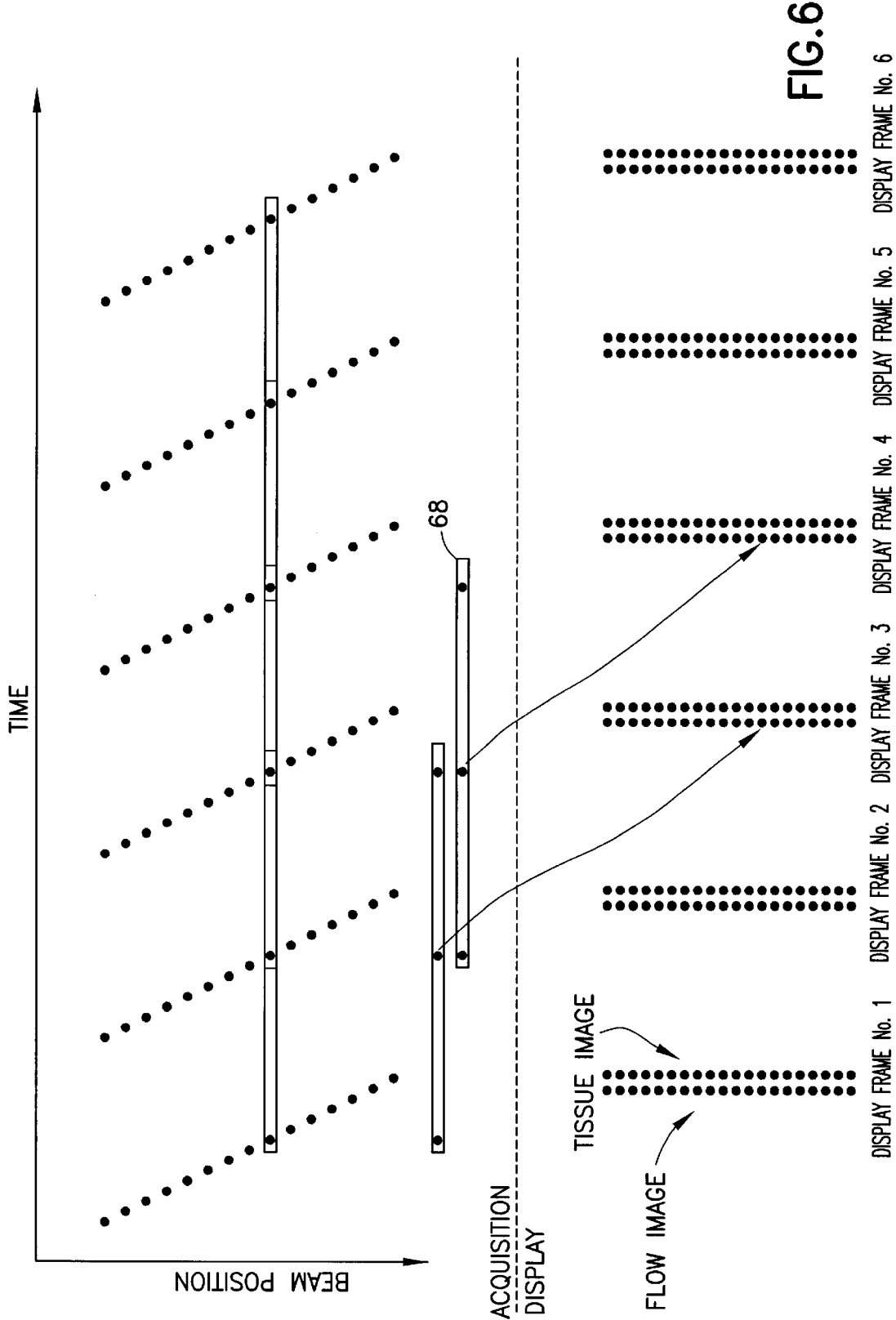

METHOD AND APPARATUS FOR VISUALIZATION OF MOTION IN ULTRASOUND FLOW IMAGING USING CONTINUOUS DATA ACQUISITION

FIELD OF THE INVENTION

This invention generally relates to ultrasound imaging of the human anatomy for the purpose of medical diagnosis. In particular, the invention relates to methods and apparatus for imaging blood vessel structures, and more particularly, to signal processing algorithms for visualization of blood movement for use in ultrasound imaging systems.

BACKGROUND OF THE INVENTION

Conventional color flow imaging, including "angio" or "power Doppler imaging" (referred to hereinafter as "flow imaging"), produces one image from a sequence of transmitted pulses (a packet), typically in the range of 5–15 pulses for each scan line in the image. Slowly moving muscular tissue produces lower Doppler shift in the received signal than signal from moving blood, and efficient clutter filters are designed to suppress the clutter signal to a level much lower than the signal from blood. The signal power after clutter filtering is used to detect points in the image where blood is present. An alternative is to display the signal power as an image (angio or power Doppler) to visualize blood vessels. In order to get reliable detection, substantial temporal and spatial averaging is used, thus limiting the dynamic variation, as well as spatial resolution (bleeding). This averaging process suppresses the spatial speckle pattern in the signal amplitude.

Conventional ultrasound blood flow imaging is based on detection and measurement of the Doppler shift created by moving scatterers. This Doppler shift is utilized to suppress the signal from slowly moving muscular tissue, in order to detect the presence of blood, and is also used to quantify the actual blood velocity in each point of an ultrasound image. Unfortunately, the Doppler frequency shift is only sensitive to the velocity component along the ultrasonic beam; possible velocity components transverse to the beam are not detected or measurable from the received signal Doppler spectrum. In standard color flow imaging, the Doppler shift is estimated from the received signal generated by a number of transmitted pulses, and coded in a color scale. In some situations, the blood flow direction can be measured from the vessel geometry, but this is difficult to do in an automatic way, especially when the vessel geometry is not clearly visible in the image. Standard color flow imaging often gives confusing blood velocity visualization; e.g., in a curved blood vessel the Doppler shift, and therefore also the color, is changing along the vessel due to change in the angle between the blood velocities and the ultrasonic beam, even though the velocity magnitude is constant. In power Doppler (also called the angio mode) this problem is solved by discarding the measured Doppler shift from the display.

There is considerable interest in measuring the transverse velocity component in ultrasound flow imaging, and a number of methods have been proposed. Compound scanning from two different positions was disclosed by Fox in "Multiple crossed-beam ultrasound Doppler velocimetry," IEEE Trans. Sonics Ultrason., Vol. 25, pp. 281–286, 1978. Compound scanning from two different positions gives two velocity components, but there are practical problems with the large-aperture transducer, the time lag between the measurement of the two components, and the limited field of view. In accordance with a method disclosed by Newhouse et al. in "Ultrasound Doppler probing of flows transverse with respect to beam axis," IEEE Trans. Biomed. Eng., Vol. 34, pp. 779–789, October 1987, the transit time through the ultrasound beam is measured, which is reflected in an increased bandwidth of the Doppler signal. This method has very low accuracy, does not yield flow direction, and will only work in regions with rectilinear and laminar flow. Two-dimensional speckle tracking methods based on frame-to-frame correlation analysis have been proposed by Trahey et al. in "Angle independent ultrasonic detection of blood flow," IEEE Trans. Biomed. Eng., Vol. 34, pp. 965–967, December 1987. This method can be used both for the RF signal and the amplitude-detected signal. Coherent processing of two subapertures of the transducer to create lateral oscillations in the received beam pattern has been described by Jensen et al. in "A new method for estimation of velocity vectors," IEEE Trans. Ultrason., Ferroelect., Freq. Contr., Vol. 45, pp. 837–851, May 1998, and by Anderson in "Multi-dimensional velocity estimation with ultrasound using spatial quadrature," IEEE Trans. Ultrason., Ferroelect., Freq. Contr., Vol. 45, pp. 852–861, May 1998. This method gives quantitative lateral velocity information, including the sign. The main drawback of this method is poor lateral resolution, which limits its use for imaging.

There is a need for a method of ultrasound imaging which gives the system user a correct perception of the blood flow direction and magnitude, and which is also useful to separate true blood flow from wall motion artifacts.

SUMMARY OF THE INVENTION

In ultrasound imaging, the returned echoes are processed coherently. In the images there are variations in the intensity due to constructive and destructive interference of the sound waves scattered back from a large number of scatterers. These variations in the intensity is often termed the "speckle pattern". When there is a slight displacement of the scatterers (red blood cells), there will be a corresponding displacement of the speckle pattern. By enhancing the speckle pattern from moving scatterers and display a stream of such images, an intuitive display of the blood flow is obtained.

The present invention comprises a method and an apparatus for imaging blood motion by preserving, enhancing and visualizing speckle pattern movement, which is related to the blood cell movement in the blood vessels. This method will be referred to herein as "blood motion imaging" (BMI). Speckle pattern movement gives the user a correct perception of the blood flow direction and magnitude, and is also useful to separate true blood flow from wall motion artifacts. In this way, the system operator can see the blood flowing in the image, although no attempt is made to measure the lateral velocity component. However, the lateral velocity component may be derived indirectly by combining an angle measurement derived from the speckle motion with the radial velocity component obtained from the Doppler frequency shift.

In the preferred embodiments of the invention, image frames of signal samples (i.e., raw acoustic data) are continuously acquired. The data input for signal processing are the beamformed and complex-demodulated I/Q data samples. Alternatively, the processing can be performed on the real-valued RF data without complex demodulation. A continuous stream of data frames, each the result of one scan, is available for processing. For each position in the scan plane (as used herein, "position" means one depth range from one beam), a respective time sequence of signal samples is available for processing. This signal is first high-pass filtered. Following the high-pass filter, a speckle signal is formed. One way of forming the speckle signal is by calculating the squared magnitude (i.e., power) of the high-pass-filtered signal (I/Q or RF). This speckle signal is then subjected to a nonlinear scale conversion to form a blood motion imaging (BMI) signal for display. An example of the nonlinear scale conversion is logarithmic compression followed by gain and dynamic range adjustment.

The motion of the blood scatterers creates a corresponding movement of the speckle pattern in the images from frame to frame, showing both radial and lateral movement. For continuous acquisition, the time between each of these frames equals the pulse repetition time (1/PRF). In order to visualize the motion, the display frame rate must be reduced substantially, e.g., from 1 kHz to 30 Hz. For real-time display, much data must be discarded, but for slow motion replay, a larger fraction or all of the recorded frames can be used. To get a sufficiently high PRF, the frame rate should be maximized.

Accordingly, the preferred tissue processing for continuous acquisition is to calculate the flow and tissue images from the same scan. In accordance with the most preferred embodiment, one tissue image is recorded for each scan by tissue processing the signal samples (sent to the high-pass filter along one signal processing path) along a separate signal processing path.

Alternatively, a separate scan can be performed for the purpose of acquiring a separate image frame of signal samples for forming the tissue image. In the latter case, the acquisition frame rate is significantly reduced.

By using a relatively broad transmit beam, it is possible to acquire several (e.g., two) receive beams per transmit beam by simultaneous beamforming in slightly different directions, thereby increasing the acquisition frame rate. This known technique is called multi-line acquisition (MLA).

In accordance with another preferred embodiment, the speckle signal is enhanced by processing the speckle signal along two separate paths. Along the second path, the speckle signal undergoes temporal and/or spatial filtering to suppress the speckle in the signal. The resulting temporally/spatially filtered signal is then subjected to a nonlinear scale conversion, and is subtracted from the original scale-converted speckle signal along the first path to form an enhanced speckle signal for imaging blood motion. In addition, to accentuate the speckle pattern in the flow image, the spatial resolution should be as high as possible by using a short transmitted pulse and a large-aperture transducer.

There are various ways of including the speckle pattern in the flow image: (1) by combining the speckle signal with the signal power and showing the combined signal in the same way as the angio mode flow image; (2) by intensity ("value" in HSV color representation) modulation of the angio image; and (3) by color coding the "age" of the speckle, in order to visualize the direction and the magnitude of the movement.

The invention can be implemented as post-processing, based on recorded I/Q data of a sequence of images, or in real-time. The invention can be implemented in hardware and/or software.

BRIEF DESCRIPTION OF THE DRAWINGS

FIG. 6 is a schematic showing blood motion imaging using continuous data acquisition: the upper part illustrates the scanning sequence; the lower part illustrates the display sequence. The horizontal axis is the time axis and vertical axis is the beam position.

DETAILED DESCRIPTION OF THE PREFERRED EMBODIMENTS

Figure 1:
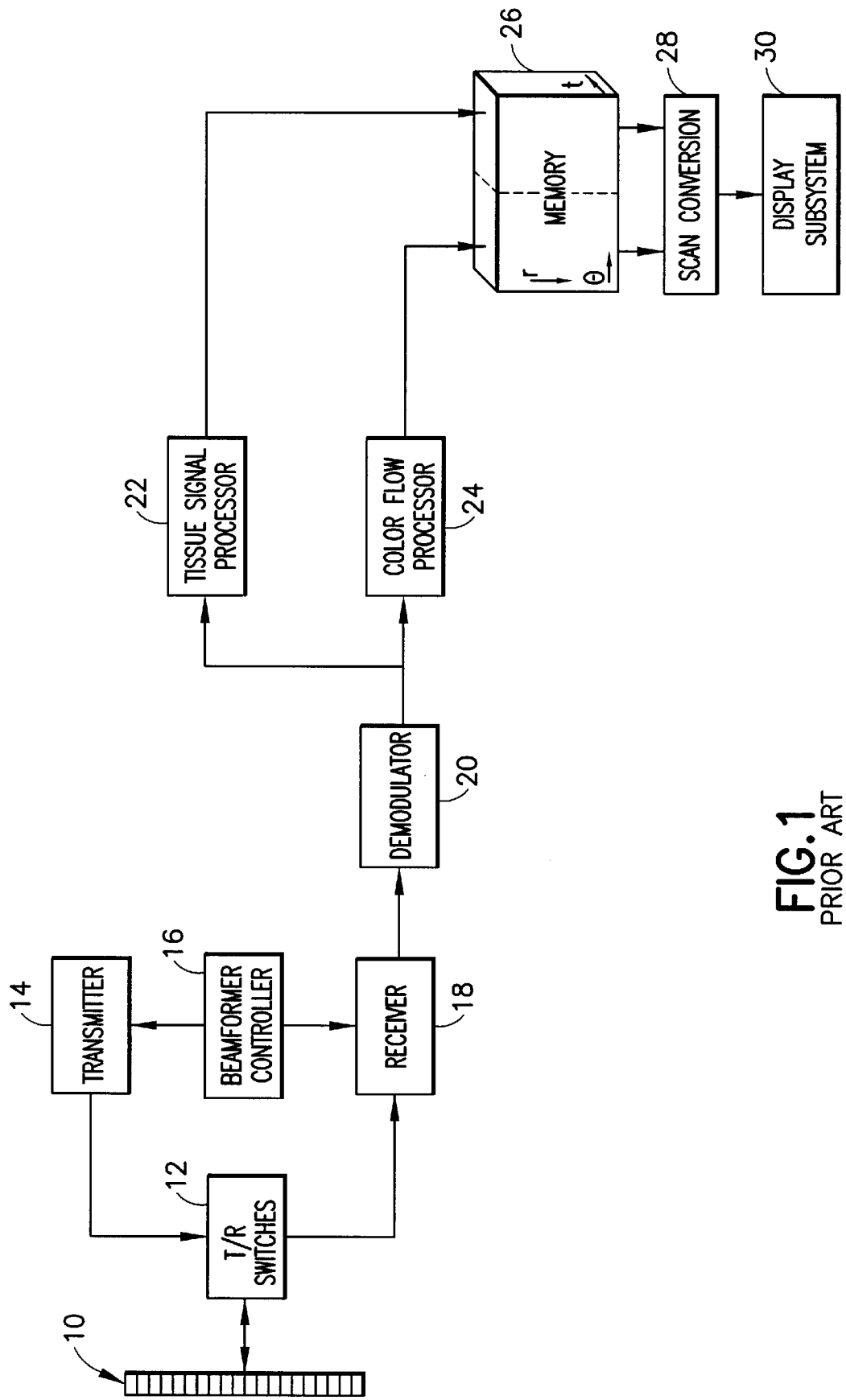
FIG. 1 is a block diagram showing a conventional ultrasound imaging system capable of superimposing a color flow image on a tissue image.

A typical ultrasound imaging system having color flow and tissue imaging is generally depicted in FIG. 1. The individual elements of an ultrasound transducer array 10 are activated by a multiplicity of pulsers of a transmitter 14 via transmit/receive (T/R) switches 12 to transmit wavelets which are focused at the same transmit focal position with the same transmit characteristics to form a transmit beam. The transmit sequences and time delays for activating the pulsers to achieve transmit beamforming are provided by a beamformer controller 16 (e.g., incorporated as software in a host computer). Each transmit beam propagates through the object being scanned and is reflected by ultrasound scatterers in the object back to the array. After each transmit firing, the echo signals detected by the transducer array elements are fed to respective receive channels of the receiver 18. The receiver 18 beamforms the echoes under the direction of the beamformer controller 16. The receiver 18 imparts the proper receive focus time delays to the received echo signal and sums them to provide an echo signal which accurately indicates the total ultrasonic energy reflected from a succession of depth ranges corresponding to a particular transmit focal zone.

In an RF system, the beamsummed RF echo signals output by the receiver 18 are sent to a tissue signal (e.g., B-mode) processor 22. The tissue signal processor typically incorporates an envelope detector for forming the envelope of the beamsummed signal. The envelope of the signal undergoes some additional tissue signal processing, such as logarithmic compression, to form display data which is stored in a memory 26 and then output to a scan converter 28. Alternatively, as shown in FIG. 1, the RF signal is demodulated to baseband by a demodulator 20, and then the in-phase and quadrature components are processed separately by the tissue signal processor.

In general, the display data is converted by the scan converter 28 into X-Y format for video display. Each frame of intensity data, representing one of a multiplicity of parallel scans or slices through the object being examined, is stored in the scan converter 28 and in the next cycle is transmitted to video processor in the display subsystem 30. The video processor maps the video data to a gray scale for video display. The gray-scale image frames are then sent to the video monitor of the display subsystem 30.

In the color flow imaging mode, a color flow processor 24 processes data acquired during additional scans, each color flow image being acquired from multiple scans. For example, a sequence of P pulses (i.e., a "packet") are transmitted to each focal position in the ROI, one color flow image being generated for each packet of scans. The color flow image data is stored in a separate part of memory 26, scan converted, video processed using a color mapping and then superimposed on the tissue image during display.

Figure 2:
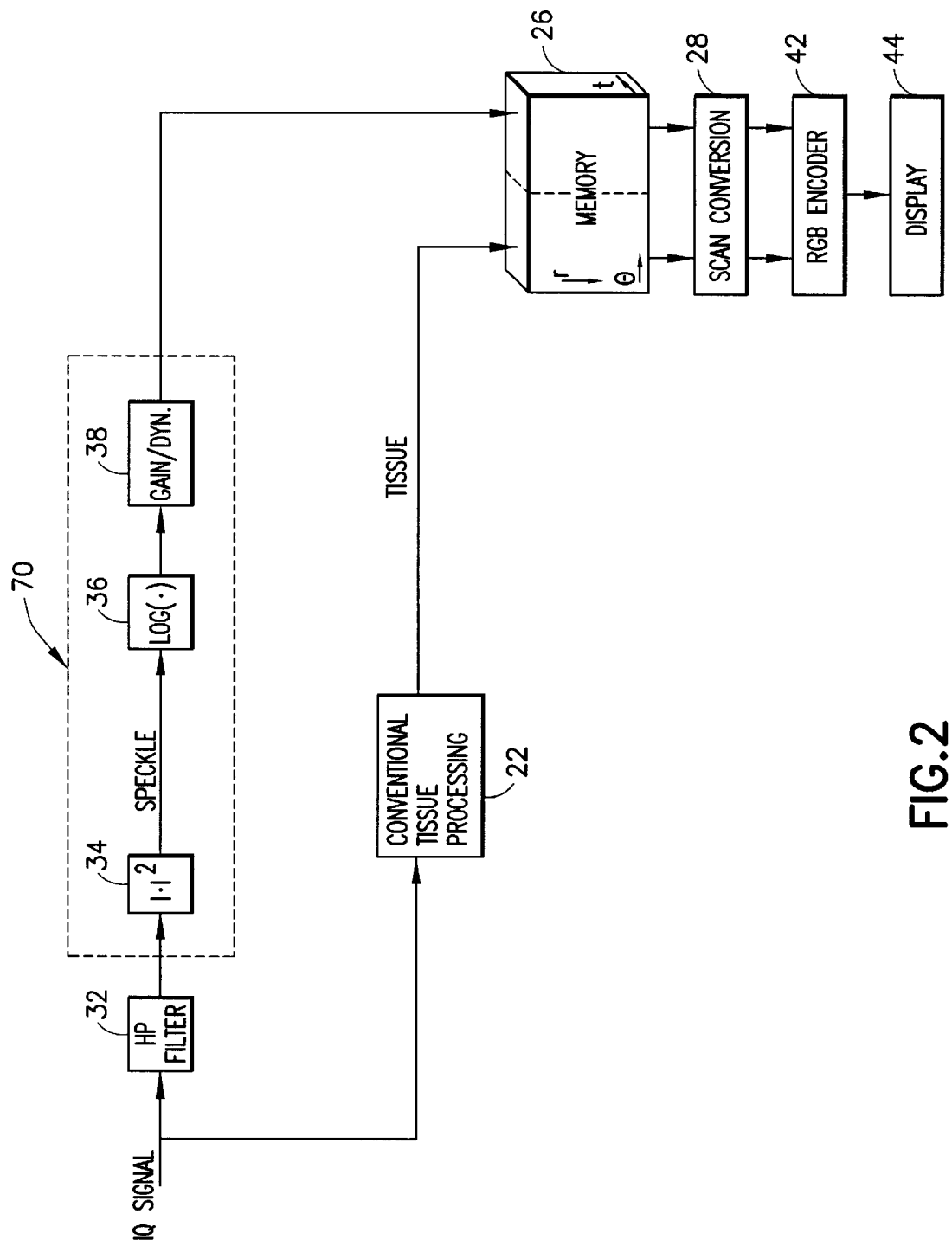
FIG. 2 is a block diagram showing one preferred embodiment of the invention for acquiring blood motion and tissue images from the same scan.

One preferred embodiment of the invention is depicted in FIG. 2, with the understanding that the input labeled "IQ Signal" is received from the demodulator depicted in FIG. 1. In accordance with this and other preferred embodiments, the data are continuously acquired by scanning a region of interest repeatedly in a timed sequence. For each scan, a single pulse is transmitted in each beam direction of the image. In accordance with the processing technique depicted in FIG. 2, one flow image and one tissue image may be displayed for each scan. Both images are calculated from the same data set.

The BMI processing shown in FIG. 2 (and later figures) is for one depth range, but the same processing is applied to all depth ranges in parallel. The data samples acquired from each range gate (following a transmit pulse) are filtered by a digital high-pass filter 32. The digital high-pass filter receives a continuous stream of signal samples. If each beam vector consists of K signal samples, representing K depth ranges, the set of received signal samples can be described by a two-dimensional signal $s(k,n)$; $k=1, \ldots, K$; $n=1, \ldots$. Now for each depth range k, the one-dimensional signal $x(n)=s(k,n)$ is input to the high-pass filter 32. The high-pass filter 32 is working independently for each depth range k.

FIG. 6 depicts the scanning and display sequences in accordance with the preferred embodiment shown in FIG. 2 for the case of a Finite Impulse Response (FIR) filter of length N=3. The FIR filter acts as a sliding window 68 with length N=3.

If the input signal is $x(n)$ and the output signal is $y(n)$, the operation of a general linear filter can be described by $$y(n) = \sum_{k=-\infty}^{\infty} x(k)h(n, k)$$

The filter can be time variant, and the output sample might depend on an infinite number of input samples. For a time invariant filter, the filtering operation simplifies to $$y(n) = \sum_{k=-\infty}^{\infty} x(k)h(n-k)$$

where $h(n)$ is called the impulse response function. In Infinite Impulse Response (IIR) filters, $h(n)$ has infinite length, while for FIR filters, $h(n)$ has a finite length. A polynomial regression filter is an example of a time-variant filter that may be used. An example of an impulse response function for a high-pass FIR filter of length J=4 is given by $h(0)=0.16$, $h(1)=0.53$, $h(2)=-0.53$, $h(3)=-0.016$ At the start of the continuous stream of samples, some of the filter output samples might have to be discarded, causing a small delay before the first image frame is available. If an FIR filter is used, the first K images, where K is the FIR filter order, must be discarded. If an IIR filter is used, several initialization techniques exist to suppress the filter transient, but some of the first images may have to be discarded. To synchronize the flow and tissue images, an equal number of tissue images need to be discarded.

Following high-pass filtering, a speckle signal is formed and processed by a speckle processor 70. In accordance with one preferred embodiment, the speckle processor 70 comprises a processor 34 which calculates the squared magnitude (i.e., power) of each output sample. If the complex I/Q signal is given by $x(k)=z(k)+iy(k)$, where z and y are real and $i=\sqrt{-1}$, then the output of processor 34 is given by $z(k)^2+y(k)^2$. In the notation shown inside processor 34, the center dot is replaced by the input signal $x(k)$. The speckle signal is then subjected to a nonlinear amplitude transformation. In FIG. 2 this transformation consists of logarithmic compression (block 36) followed by gain and dynamic range adjustment (block 38). The resulting speckle signals from speckle processor 70 are continuously stored in memory 26.

In accordance with the preferred embodiment shown in FIG. 2, the same acquired data is used to calculate both the blood motion image and the tissue image. As part of the conventional tissue signal processing 22, the envelope of the IQ signal (without high-pass filtering) is calculated using the formula $(z(k)^2+y(k)^2)^{1/2}$. The tissue signal processor 22 operates on each I/Q signal sample, whereas block 34 operates on a high-pass filtered version of the I/Q signal samples. The resulting tissue images are stored in a separate part of memory 26. Each tissue image and each blood motion image are scan converted by scan converter 28 and sent to the RGB encoder 42. A simple combination of the blood motion image and the tissue image can be used for the RGB components of the image displayed by the display subsystem 44. One example is: R=4×BMI+2×tissue; G=BMI+4×tissue; and B=4×tissue. A combination producing a gray-scale image is also possible.

Figure 3:
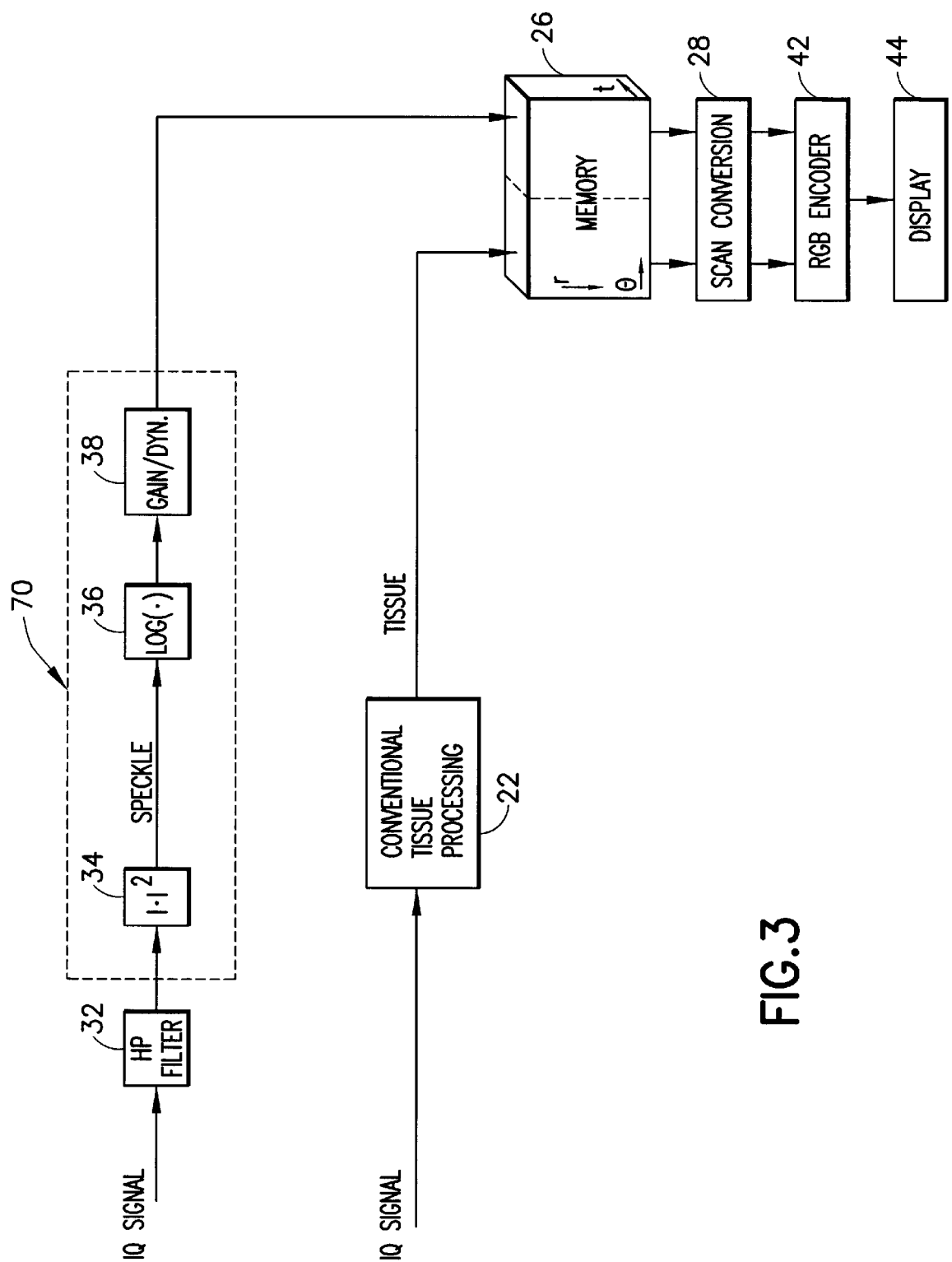
FIG. 3 is a block diagram showing one preferred embodiment of the invention for imaging based on separate blood motion and tissue scans.

In accordance with the preferred embodiment shown in FIG. 3, a separate scan is performed to acquire the tissue (e.g., B-mode) image in a conventional manner. One tissue scan is performed for each BMI scan. Preferably, the tissue scans are alternated with the BMI scans. This embodiment enables a first region of interest to be scanned during each BMI scan and a second region of interest, larger than the first region of interest, to be scanned during each tissue scan. The BMI scan data acquired during alternate (e.g., even-numbered) scans is high pass filtered and then processed to form the speckle signal, while the tissue scan data acquired during, e.g., odd-numbered scans is envelope detected. [As before, FIG. 3 represents an embodiment wherein the inputs labeled "IQ Signal" are received from the demodulator depicted in FIG. 1. The blocks in FIG. 3 having reference numerals identical to those for respective blocks in FIG. 2 have the same functions previously described with reference to FIG. 2.] The data are continuously acquired by scanning the first region of interest in a first timed sequence having a first vector spacing and a first number of transmit focal positions per vector and then scanning the second region of interest in a second timed sequence having a second vector spacing and a second number of transmit focal positions per vector. Optionally the first vector spacing can be different than the second vector spacing and/or the first number of transmit focal positions per vector can be different than the second number of transmit focal positions per vector. Then the flow image is displayed superimposed on the larger tissue background image.

Figure 4:
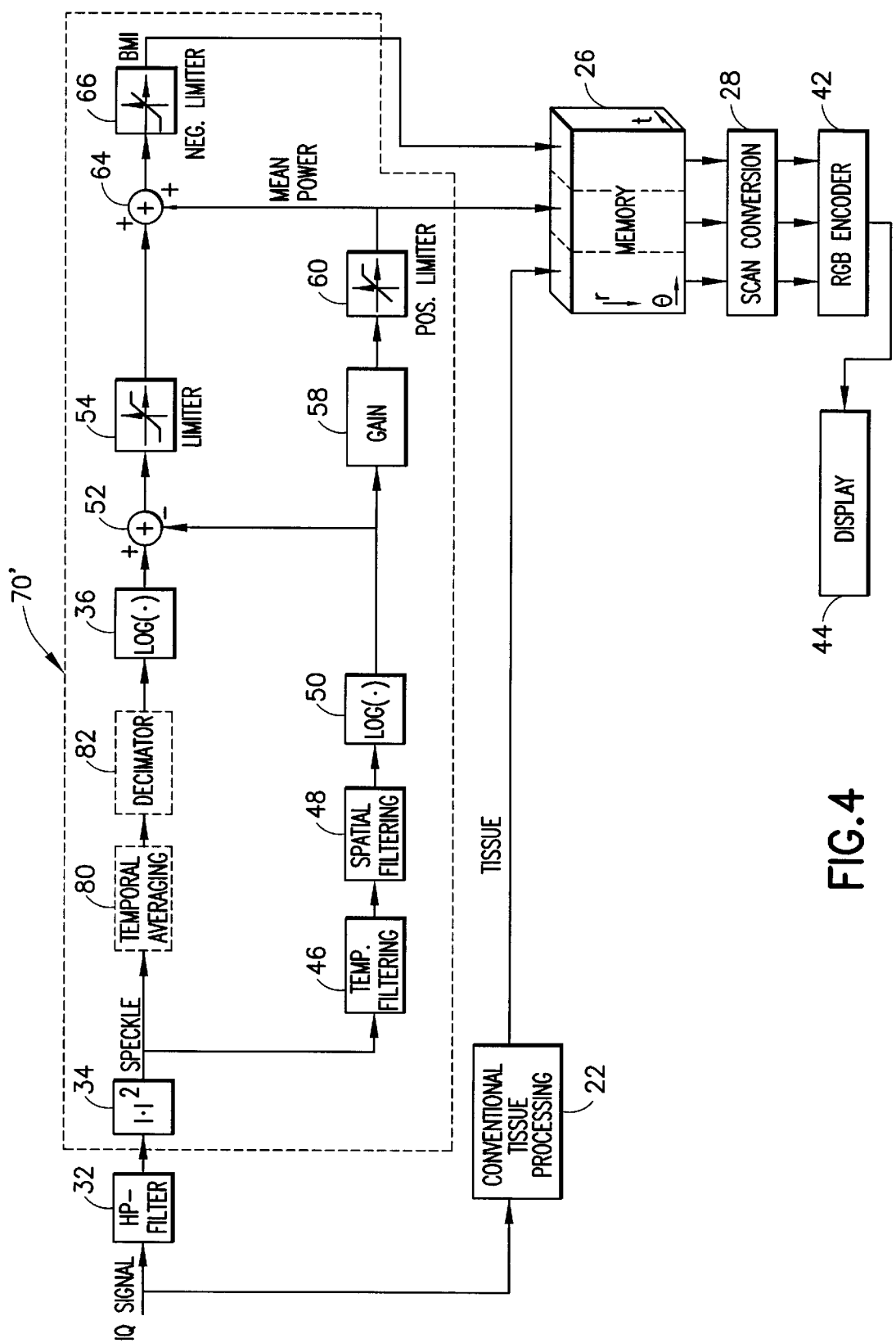
FIG. 4 is a block diagram showing another preferred embodiment of the invention which utilizes temporal and/or spatial filtering to enhance the speckle signal.

FIG. 4 shows a further preferred embodiment in which the speckle signal is enhanced by amplitude normalization to provide a smoother display. This is accomplished by subtracting a temporally and spatially filtered, and scale converted version of the speckle signal from the scale converted speckle signal itself in the speckle processor 70', thereby forming an enhanced speckle signal for imaging blood motion.

As seen in FIG. 4, following the high-pass filter 32, the squared magnitude of the filtered I/Q signal samples is calculated in processor 34, as previously described. For each input sample x(k), there is a corresponding output sample which is $z(k)^2+y(k)^2$. The speckle signal output by the processor 34 is sent along two signal processing paths. In the first path, The speckle signal is subjected to logarithmic compression in block 36. In the second path, the speckle signal is preferably subjected to temporal filtering 46 followed by spatial filtering 48. The samples output by the temporal filter 46 are preferably a weighted average of a number of samples from different times. The samples output by the spatial filter 48 are preferably a weighted average of a number of temporally filtered samples from different spatial positions. In accordance with the preferred embodiment, filters 46 and 48 have a low-pass characteristic and thus serve to smooth rapid variations (i.e., suppress the speckle) in the signal. (In contrast, the high-pass filter 32 suppresses the slow variations as opposed to the rapid variations.) The logarithm of the temporally and spatially filtered signal is calculated in block 50. All of the subsequent processing is done in the log domain.

An amplitude-normalized speckle signal is obtained by subtracting the logarithm of the temporally and spatially filtered speckle signal from the logarithm of the speckle signal in adder/subtractor 52 (see FIG. 4). Subtraction in the log domain is equal to the logarithm of the fraction of the corresponding linear signals. The I/Q-signal is a zero-mean complex Gaussian process. The squared amplitude signal divided by the mean power (variance) is exponentially distributed with mean value equal to unity. The samples of the amplitude-normalized speckle signal are therefore identically distributed, where the distribution is found by a logarithmic transformation of the exponential distribution. This speckle signal may be limited (block 54) to lie within a certain confidence interval determined by the probability distribution. The output of limiter 54 can be stored in memory without further processing, and displayed as previously described in relation to FIG. 2.

FIG. 4 depicts more advanced signal processing. The speckle signal is made visible in the flow image display by modifying the color pixel value in the areas of the image where blood flow is detected. One way of obtaining this effect is to combine the mean signal power with the speckle signal into one value which controls, for instance, the brightness of the pixel value. This can be done in the following way. The gain of the temporally/spatially filtered speckle signal is adjusted in block 58. The resulting signal is limited to a maximum positive value (positive limiter 60) given by a specified dynamic range. The negative signal values are not limited to zero. The positively limited signal is then sent to an adder/subtractor 64. The fluctuating power (i.e., speckle) signal is limited (limiter 54) and added (adder/subtractor 64) to the mean power signal, and the negative values are set equal to zero (negative limiter 66). When the mean signal has maximum value, the total signal spans the dynamic range of the display. When the mean signal is less than maximum, the smallest part of the total signal is lost. The mean signal may be used in the RGB encoder 42, which then includes a tissue/flow arbitration function.

The preferred embodiment shown in FIG. 4 does not require both temporal and spatial filtering. Alternatively, temporal filtering can be performed without spatial filtering or spatial filtering can be performed without temporal filtering.

In addition to the blocks shown in FIG. 4, the speckle processor 70' may optionally include a temporal averager (indicated by dashed block 80) following the magnitude squaring block 34. This temporal averaging produces lines in the speckle along the direction of the blood flow. Following this averager, a temporal decimator (indicated by dashed block 82 in FIG. 4) may optionally be included to get a frame rate suitable for real-time display. A similar decimation is then necessary for the tissue signal and the signal in the second speckle branch.

Figure 5:
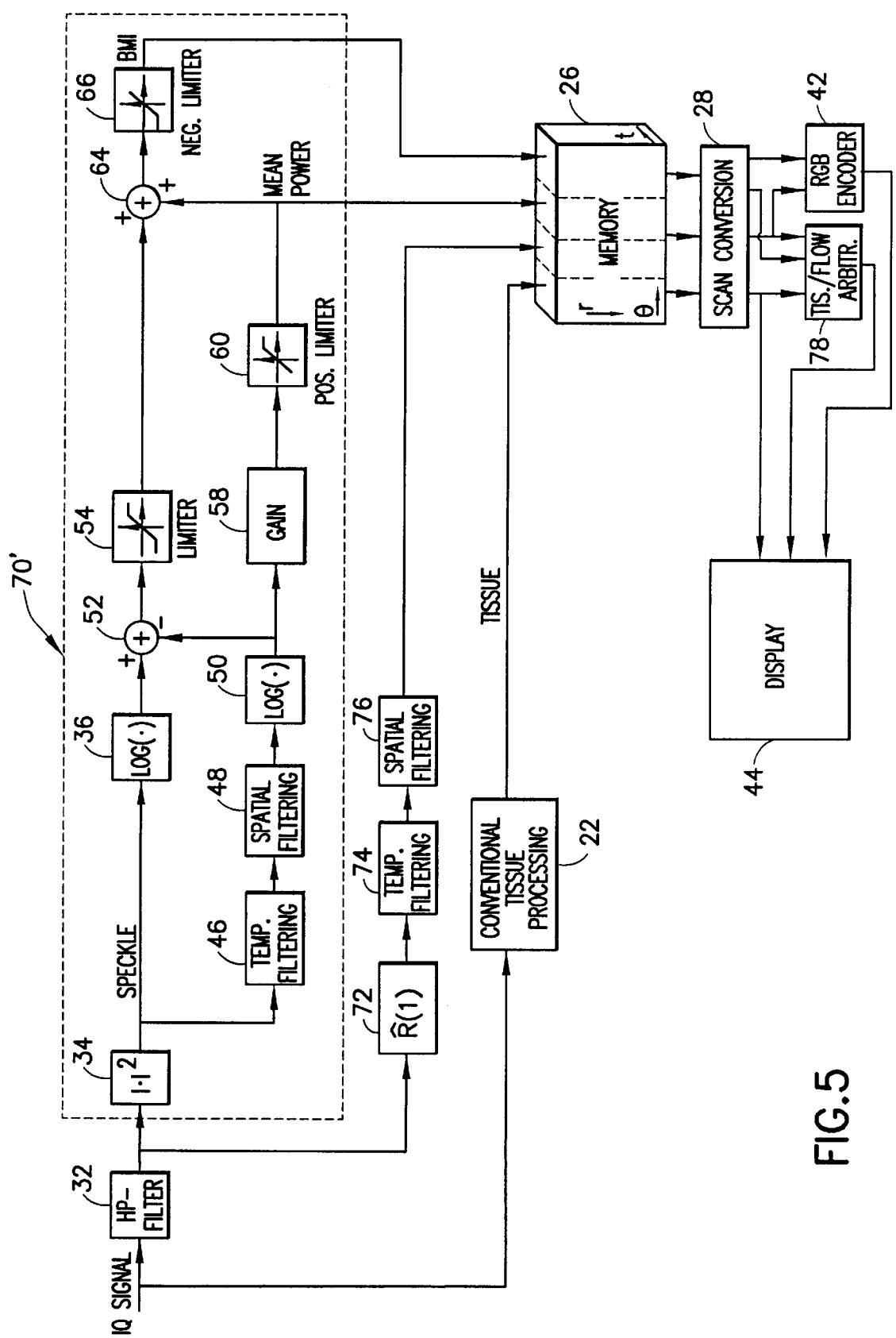
FIG. 5 is a block diagram showing yet another preferred embodiment of the invention where the enhanced speckle signal is combined with estimates of the radial velocity component.

FIG. 5 depicts a further preferred embodiment combining the speckle signal with estimates of the radial velocity component. Blocks having the same numbers as blocks in FIG. 4 have the same function as previously described. In the autocorrelation estimator block 72, a continuous stream of estimates of the autocorrelation function at temporal lag equal to one is found as follows:

$$\hat{R}(1)=x(k)^*x(k-1)$$

where the asterisk represents complex conjugation, e.g., if x=z+iy, then x*=z−iy. These complex-valued autocorrelation estimates are temporally filtered in block 74 and spatially filtered in block 76. The autocorrelation values are stored in memory 26, and the velocity values are calculated as a part of the display algorithm. Alternatively, the velocity values are calculated prior to memory 26, and stored instead of the autocorrelation values.

In accordance with the preferred embodiment depicted in FIG. 5, the BMI signal, mean power signal, radial velocity signal, and tissue signal are used to calculate the blood motion image for display. First, the scan conversion block 28 scan converts these four signals. Then a decision is made for each pixel whether it is a tissue pixel or a flow pixel. This tissue/flow arbitration (block 78) is based on the tissue, mean power and radial velocity signals. The RGB values of the flow pixels are determined by the BMI signal and the radial velocity signal (RGB encoder 42). The color is chosen based on the radial velocity signal, while the BMI signal determines the brightness of the color.

The upper part of FIG. 6 shows the scanning sequence and the lower part shows the display sequence for the system depicted in FIG. 2. The horizontal axis is the time axis; the vertical axis is the beam position. In the upper part, each dot represents the received signal vector from one transmitted pulse. If MLA is used, two or more signal vectors with slightly different beam positions will be present for each time instance. FIG. 6 shows a situation without MLA (for clarity). The scanning sequence is programmed so that data is continuously acquired using successive scans of a region of interest. This is similar to conventional B-mode scanning. However, in the present case, a number of consecutive scans are stored in memory, and BMI processing is applied to a sequence of signal samples from one position by a sliding window, e.g., of length 3 in FIG. 6. In this example, each displayed flow frame is calculated from the preceding three scans, while each displayed tissue frame is calculated from the preceding one scan. Referring to FIG. 2, the number of signal samples after the high-pass filter 32 is M=3 for the example shown in FIG. 6.

In accordance with the preferred embodiments disclosed herein, the continuously acquired data for blood motion imaging is processed as follows. The input data are the beamformed, complex demodulated, and time-gain compensated I/Q data. Alternatively, the processing can be done on the real-valued radiofrequency (RF) data without complex demodulation. The continuous stream of signal samples from each position for successive scans form a complex-valued (assuming I/Q data is used) signal. The signal thus consists of samples in time from one sample volume with sampling frequency equal to the frame rate. The signal samples have a zero mean complex Gaussian distribution.

The blood motion imaging method can also be used in combination with ultrasound contrast imaging. The contrast agent enhances the scattering from blood, which increases the sensitivity and make clutter filtering less critical. The blood motion imaging method may be used in combination with all known methods for contrast enhancement using a sequence of transmit pulses per scan line, including fundamental and second harmonic power Doppler, the pulse-inversion technique, and coded excitation. Variations of the echo from frame to frame caused by movement and/or destruction of the contrast particles will create changes in the speckle pattern in the image, which makes visual detection of small concentrations of contrast agent easier. In intermittent imaging, which is often used for contrast imaging, the blood motion imaging method is of special importance, since a multiplicity of images are displayed for each recorded data set, giving a more continuous stream of images, where speckle fluctuations indicate the presence of contrast agent. The term "intermittent imaging" as used herein refers to the technique of stopping the data acquisition for a defined time period between each frame. The time between each frame is typically one or several heart cycles.

Several pulse compression techniques exist to improve the signal-to-noise ratio (SNR) without increasing the amplitude of the transmitted pulse. One such technique is described by Haider et al. in "Pulse Elongation and Deconvolution Filtering for Medical Ultrasonic Imaging," IEEE Trans. Ultrason., Ferroelect., Freq. Contr., Vol. 45, pp. 98–113, January 1998. The input signal to the BMI processing described herein can be acquired using such techniques which increase the SNR.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An imaging system comprising:
   a data acquisition subsystem for acquiring data samples which are a function of ultrasound energy returned following the transmission of respective pulses during respective scans;
   a temporal high-pass filter coupled to said data acquisition subsystem for high-pass filtering said data samples to form high-pass filtered samples;
   a first processor for calculating a set of motion signal samples from said high-pass filtered samples;
   a second processor for determining the magnitude of each of said acquired data samples to form respective tissue signal samples; and
   a display system for successively displaying image values at each pixel, each image value being derived as a function of a respective tissue signal sample and a respective motion signal sample.

2. The system as recited in claim 1, wherein said data acquisition system comprises a receiver and a demodulator, each of said data samples comprising the in-phase and quadrature components output by said demodulator.

3. The system as recited in claim 1, wherein said first processor comprises:

means for forming a respective speckle signal sample for each of the said high-pass filtered samples; and
   a scale converter for converting said speckle signal samples from a linear scale to a nonlinear scale.

4. The system as recited in claim 3, further comprising:
   means for filtering said speckle signal samples in at least one of the spatial and temporal domains;
   a scale converter for converting said filtered speckle signal samples from a linear scale to a nonlinear scale; and
   a subtracter for subtracting a respective one of said scale-converted filtered speckle signal samples from a respective one of said scale-converted speckle signal samples, thereby forming amplitude-normalized speckle signal samples,
   wherein said display system successively displays image values being derived as a function of a corresponding one of the amplitude-normalized speckle signal samples and a corresponding one of the tissue signal samples.

5. The system as recited in claim 4, wherein said scale converters apply a logarithmic function.

6. The system as recited in claim 4, further comprising:
   a third processor for calculating enhanced speckle signal samples as a function of a corresponding one of the amplitude-normalized speckle signal samples and a corresponding one of the scale-converted filtered speckle signal samples,
   wherein said display system successively displays image values being derived as a function of a corresponding one of the tissue signal samples, a corresponding one of the enhanced speckle signal samples and a corresponding one of the scale-converted converted filtered speckle signal samples.

7. The system as recited in claim 6, further comprising a fourth processor for forming velocity estimates as a function of said high-pass filtered samples, wherein said display system successively displays image values at each pixel, each of said image values being derived as a function of a corresponding one of said tissue signal samples, a corresponding one of said enhanced speckle signal samples, and a corresponding one of said velocity estimates.

8. The system as recited in claim 3, wherein said first processor further comprises a signal averager for forming time-averaged speckle signal samples prior to scale conversion.

9. The system as recited in claim 3, wherein said first processor further comprises a decimator for temporally decimating the speckle signal samples.

10. The system as recited in claim 3, further comprising a third processor for forming velocity estimates as a function of said high-pass filtered samples, wherein said display system successively displays image values at each pixel, each of said image values being derived as a function of a corresponding one of said tissue signal samples, a corresponding one of said speckle signal samples and a corresponding one of said velocity estimates.

11. The system as recited in claim 1, wherein said data acquisition subsystem acquires separate data samples for the tissue signal and the motion signal.

12. A method for imaging, comprising the steps of:
   acquiring data samples which are a function of ultrasound energy returned following the transmission of respective pulses during respective scans;
   temporally high-pass filtering said data samples to form filtered samples;

calculating a set of motion signal samples from said high-pass filtered samples;

determining the magnitude of each of said acquired data samples to form respective tissue signal samples; and successively displaying image values at each pixel, each image value being derived as a function of a respective tissue signal sample and a respective motion signal sample.

13. The method as recited in claim 12, wherein said calculating step comprises the steps of:

forming a respective speckle signal sample for each of the said high-pass filtered samples; and converting said speckle signal samples from a linear scale to a nonlinear scale.

14. The method as recited in claim 13, wherein said calculating step further comprises the step of forming time-averaged speckle signal samples prior to scale conversion.

15. The method as recited in claim 13, wherein said calculating step further comprises the step of temporally decimating the speckle signal samples.

16. The method as recited in claim 13, further comprising the steps of:

forming velocity estimates as a function of said high-pass filtered samples; and successively displaying image values at each pixel, each of said image values being derived as a function of a corresponding one of said tissue signal samples, a corresponding one of said speckle signal samples and a corresponding one of said velocity estimates.

17. The method as recited in claim 13, further comprising the steps of:

filtering said speckle signal samples in at least one of the spatial and temporal domains;

converting said filtered speckle signal samples from a linear scale to a nonlinear scale;

subtracting a respective one of said scale-converted filtered speckle signal samples from a respective one of said scale-converted speckle signal samples, thereby forming amplitude-normalized speckle signal samples; and successively displaying image values derived as a function of a corresponding one of the amplitude-normalized speckle signal samples and a corresponding one of the tissue signal samples.

18. The method as recited in claim 17, wherein said scale conversion applies a logarithmic function.

19. The method as recited in claim 17, further comprising the steps of:

calculating enhanced speckle signal samples as a function of a corresponding one of the amplitude-normalized speckle signal samples and a corresponding one of the scale-converted filtered speckle signal samples; and successively displaying image values derived as a function of a corresponding one of the tissue signal samples, a corresponding one of the enhanced speckle signal samples and a corresponding one of the scale-converted filtered speckle signal samples.

20. The method as recited in claim 19, further comprising the step of forming velocity estimates as a function of said high-pass filtered samples, wherein said displayed image values are derived also as a function of a respective velocity estimate.

21. The method as recited in claim 12, wherein said data acquisition step comprises acquiring separate data samples for the tissue signal and the motion signal.

22. A system for imaging blood motion comprising:

a transducer array comprising a multiplicity of transducer elements for transmitting wave energy in response to electrical activation and transducing returned wave energy into analog electrical signals;

an analog-to-digital converter for converting said analog electrical signals into digital data samples;

a display monitor for displaying an image; and a computer programmed to perform the following steps:
controlling said transducer array to acquire data samples which are a function of ultrasound energy returned following the transmission of respective pulses during respective scans;

temporally high-pass filtering said data samples to form high-pass filtered samples;

calculating of motion signal samples from said high-pass filtered samples; and controlling said display monitor to successively display image values derived as a function of said motion signal samples.

23. The system as recited in claim 22, wherein said calculating step comprises the steps of:

forming a respective speckle signal sample for each of the said high-pass filtered samples; and converting said speckle signal samples from a linear scale to a nonlinear scale.

24. The system as recited in claim 23, wherein said computer is further programmed to perform the steps of:

filtering said speckle signal samples in at least one of the spatial and temporal domains;

converting said filtered speckle signal samples from a linear scale to a nonlinear scale;

subtracting a respective one of said scale-converted filtered speckle signal samples from a respective one of said scale-converted speckle signal samples, thereby forming amplitude-normalized speckle signal samples; and controlling said display monitor to successively display image values derived as a function of a corresponding one of the amplitude-normalized speckle signal samples.

25. The system as recited in claim 24, wherein said scale conversion applies a logarithmic function.

26. The system as recited in claim 24, wherein said computer is further programmed to perform the steps of:

calculating enhanced speckle signal samples as a function of a corresponding one of the amplitude-normalized speckle signal and a corresponding one of the scale-converted filtered speckle signal samples; and controlling said display monitor to successively display image values derived as a function of a corresponding one of the enhanced speckle signal samples and a corresponding one of the scale-converted filtered speckle signal samples.

27. The system as recited in claim 26, wherein said computer is further programmed to perform the steps of:

calculating a respective tissue signal sample corresponding to each of said speckle signal samples;

forming velocity estimates as a function of said high-pass filtered samples; and controlling said display system to successively display image values at each pixel, each image value being derived as a function of a corresponding one of the tissue signal samples, a corresponding one of the enhanced speckle signal samples, and a corresponding one of the velocity estimates.

28. The system as recited in claim 23, wherein said calculating step further comprises the step of forming time-averaged speckle signal samples prior to scale conversion.

29. The system as recited in claim 23, wherein said calculating step further comprises the step of temporally decimating the speckle signal samples.

30. The system as recited in claim 23, wherein said computer is further programmed to perform the steps of:

forming velocity estimates as a function of said high-pass filtered samples; and controlling said display system to successively display image values at each pixel, each of said image values being derived as a function of a corresponding one of said speckle signal samples and a corresponding one of said velocity estimates.

31. The system as recited in claim 22, wherein said computer is further programmed to perform the steps of:

determining the magnitude of each of said acquired data samples to form respective tissue signal samples; and controlling said display system to successively display respective image values at each pixel, each image value being derived as a function of a respective motion signal sample and a respective tissue signal sample.

32. The system as recited in claim 22, wherein said data acquisition step comprises acquiring a respective additional data sample for each of said data samples, said respective additional data samples also being a function of ultrasound energy returned following the transmission of a respective pulse during respective additional scans interleaved with said scans, and said computer is further programmed to perform the steps of:

determining the magnitude of each of said additional acquired data samples to form respective tissue signal samples; and controlling said display system to successively display respective image values at each pixel, each image value being derived as a function of a respective motion signal sample and a respective tissue signal sample.

* * * * *

UNITED STATES PATENT AND TRADEMARK OFFICE
CERTIFICATE OF CORRECTION

PATENT NO. : 6,277,075 B1
DATED : August 21, 2001
INVENTOR(S) : Hans Garmann Torp and Steinar Bjaerum It is certified that error appears in the above-identified patent and that said Letters Patent is hereby corrected as shown below:

<u>Column 5,</u>
Line 56, replace the last number in the lne "-0.016" with -- 0.16 --.

Signed and Sealed this

Twenty-sixth Day of February, 2002

Attest:

JAMES E. ROGAN
*Attesting Officer*  *Director of the United States Patent and Trademark Office*